FIP8102 XR 3,641,252 264 R

CROSS REFERENCE

[15] 3,641,252

Fournillon

[45] Feb. 8, 1972

SEARCH ROOM

[54] DEVICE FOR CARRYING A FLAT ELECTRONIC APPARATUS BY AN AIRCRAFT

[72] Inventor: Germain Fournillon, Paris, France

[73] Assignee: Electronique Marcel Dassault, Paris, France

[22] Filed: Apr. 10, 1970

[21] Appl. No.: 27,360

[30] Foreign Application Priority Data

Apr. 28, 1969 France ..................................6913425

[52] U.S. Cl. ....................174/52 R, 244/1 TD, 317/101 DH, 325/115, 325/352

[51] Int. Cl. ..........................................................H05k 5/02

[58] Field of Search.........................174/52 R; 244/1 TD, 31; 317/99, 101 R, 101 DH; 325/111, 115, 119, 312, 352, 355, 356, 357, 361

[56] References Cited

UNITED STATES PATENTS

| | | | |
|---|---|---|---|
| 2,764,713 | 9/1956 | Alden | 325/355 X |
| 2,876,277 | 3/1959 | Badger et al. | 174/52 R |
| 3,258,649 | 6/1966 | Arguin et al. | 317/101 DH |

*Primary Examiner*—Laramie E. Askin
*Attorney*—Charles E. Temko

[57] ABSTRACT

A device for carrying a flat electronic apparatus by an aircraft comprises a cylindrical housing of lightweight material having a metallized external surface and containing in its inner space slide-type holding and guide means for printed electronic circuit cards or the like. Two or more housings connected by coupling collars can be disposed in axial alignment.

4 Claims, 7 Drawing Figures

3641252

DEVICE FOR CARRYING A FLAT ELECTRONIC APPARATUS BY AN AIRCRAFT

This invention relates to a device for carrying a flat electronic apparatus by an aircraft.

It is already known to transmit and receive information through electromagnetic wave systems of which the electronic component element are arranged as a flat assembly mainly in the form of printed circuits.

In the specific case of the carrying of an electronic apparatus of this character by means of an aircraft, such as a balloon, it was found that none of the hitherto known devices was capable of meeting the severe and contradictory requirements arising under such circumstances.

This gap is filled by the present invention. To this end, the present invention provides a carrying device characterized in that it comprises a cylindrical housing of lightweight material having a metallized external surface and containing in its inner space slide-type holding and guide means for printed electronic circuit cards, this housing comprising at one end means for suspending same from an aircraft and at the other end means for suspending and connecting an aerial.

According to an embodiment, the apparatus comprises two or more housings of this type, disposed in axial alignment, and connecting means interposed between two adjacent housings.

This device ensures an efficient protection of the electronic component elements against the extremely severe weather conditions prevailing at very high altitude, notably very low temperatures, on the other hand, it preserves said component elements from the effect of accelerations likely to be imparted to the device. It is light in weight, thus keeping the volume of the carrier craft within reasonable limits. Moreover, it does not constitute a hazard for airplanes or other crafts flying at very high speeds and likely to strike it.

In order to afford a clearer understanding of this invention and of the manner in which the same may be carried out in practice, an embodiment will now be described in detail with reference to the accompanying drawing, in which.

Figure 1:
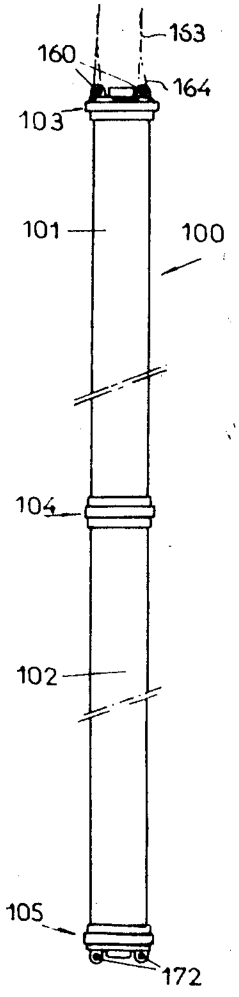
FIG. 1 is a general side elevational view of the device.
Figure 2:
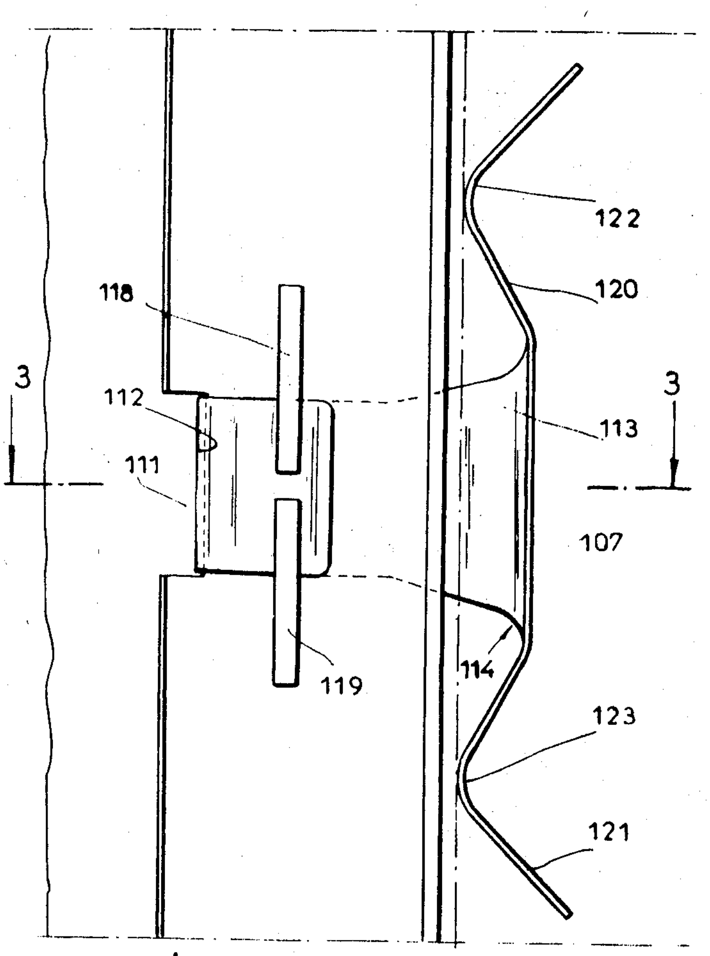
FIG. 2 is a fragmentary elevational view showing on a larger scale one portion of the interior of the device.
Figure 3:
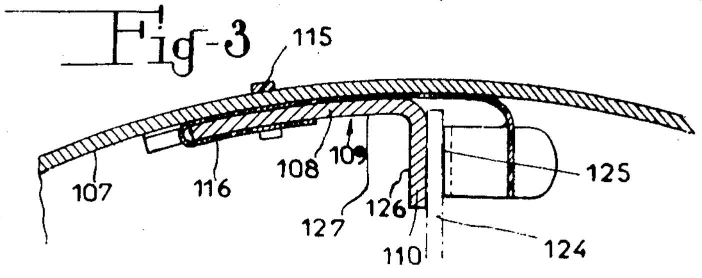
FIG. 3 is a section taken along the line 3—3 of FIG. 2.
Figure 7:
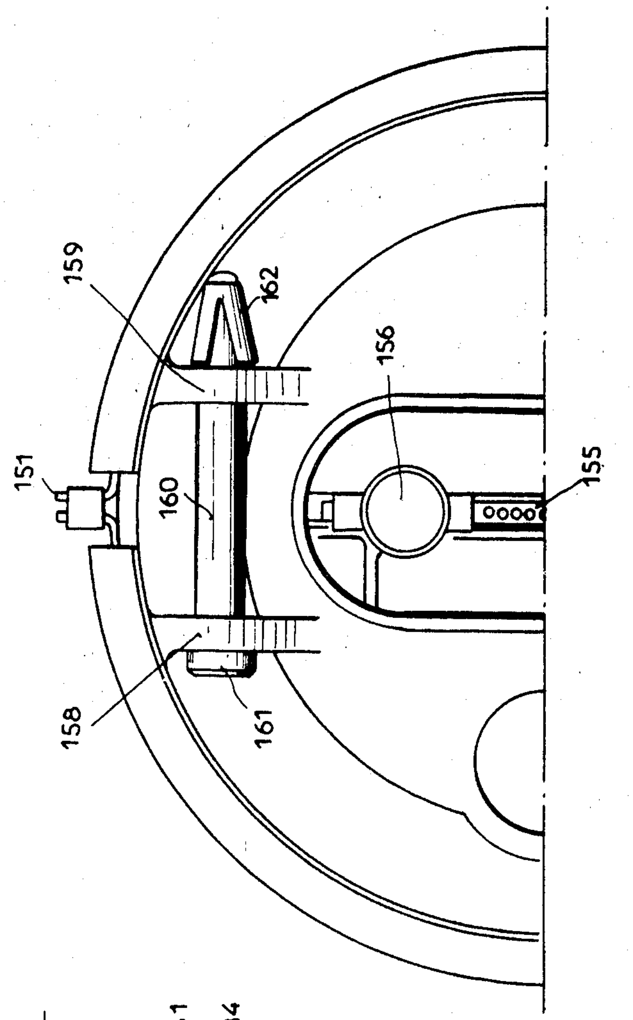
FIG. 7 is a fragmentary plan view of the cover.

The apparatus comprise essentially a cylindrical casing or housing 100 consisting of a pair of cylindrical casing elements 101 and 102 assembled end to end and aligned coaxially. The upper element 101 is closed by an upper cover 103 and assembled to the lower element 102 by means of a coupling device 104. The lower element 102 is closed at its bottom end by a cover 105.

Both elements 101 and 102 advantageously consist of cardboard impregnated with phenolic resin and having metallized outer surfaces 106. However, Bakelite-impregnated cardboard may also be used; the thickness of this cardboard may be for example of the order of 0.4 mm. The metallization may be obtained by gun-spraying of zinc (Schoopage) or silver-containing lacquer.

On the inner face 107 of a casing element is applied a wing 108 of an angle member 109 this angle member advantageously consisting of cardboard impregnated with phenolic resin, the other shorter wing 110 of this angle member being directed radially inwards of the tubular casing. The wing 108 of angle member 109 has formed therein at spaced intervals a series of rectangular notches 111. Bent about the bottom 112 of one of these notches is the anchoring lug 113 of a spring blade 114 of adequate material, for example beryllium bronze, and a fastening member 115 extending through the casing wall 107 as well as the spring anchoring lug

113 and the upturned position 116 thereof is provided for securing the assembly by means of its lateral arms 118 and 119. The spring anchoring lug 113 has horn-shaped blade extensions 120 and 121 in resilient pressure relationship through their apices 122 and 123 with the aforesaid wing 110.

With this arrangement it is possible to insert or slip the printed-circuit card 12 between the blade extensions 120 and 121 of the successive springs secured along one case and the wing 110, on the one hand, and along the opposite edge of the printed circuit card 124 between the blade extensions (not shown) of other springs secured to the casing 107 in a diametrally opposite portion thereof.

A plurality of such cards may be inserted in succession for example through the top opening of the upper case 101, before fitting the cover 103 thereof, one card pushing the next card underneath, until the upper and/or lower casing is or are filled with the desired amount of cards. In the position thus reached each card is resiliently clamped between the spring extensions and the free wing 110 of the angle member.

If desired the spring may be used as an electrical connecting member for example by grounding a metallized portion 125 of card 124 by means of the fastening member 115.

The inner surfaces 126 and 127 of said angle member may be metallized or not according to the specific character of the component elements contained in the case 101.

Figure 4:
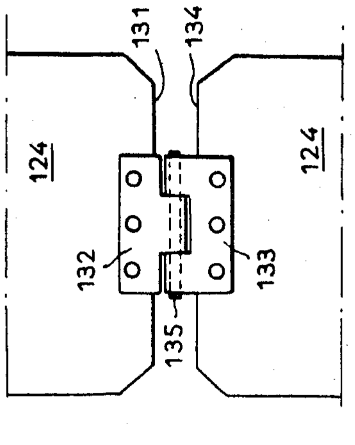
FIG. 4 is a view showing a hinge connection between a pair of adjacent cards.
Figures 5, 6:
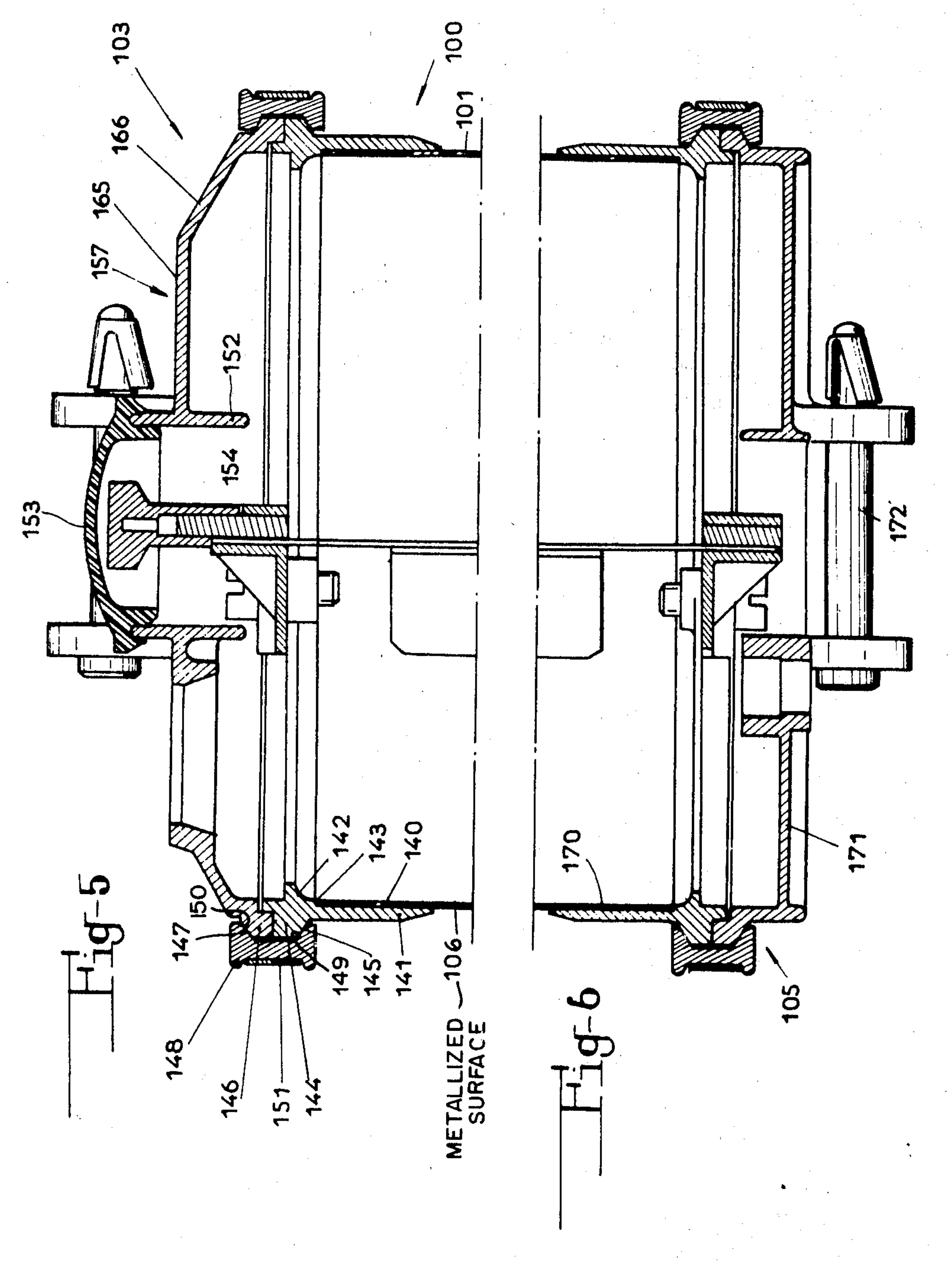
FIG. 5 is a diametral section taken across the upper end of the device.
FIG. 6 is a diametral section taken across the lower end of the device.

In the form of embodiment illustrated in FIG. 4 a transverse edge 131 of a printed circuit card carries a first hinge member 132 coupled by a pin 135 to another companion hinge member 133 secured to the registering edge 134 of he adjacent card. This device permits a relative angular movement of two adjacent cards about a transverse axis.

The guiding and holding action exerted by the spring blades permits the use of cards that are not strictly flat. Moreover, these cards are safely protected from shocks and vibration by being resiliently held in position.

In the upper zone 140 the case 101 has fitted thereto a collar 141 bearing with an inner bead 142 against the top edge 143 of the casing. An external bead 144 formed with a frustoconical face 145 is provided for securing the cover 103 formed to this end with an external bead 146 having a frustoconical face 147, the assembly being clamped in position by a collar 148 formed with conjugate frustoconical faces 149 and 150, said collage 148 consisting of one or several section and be retained by a tightening strap 151. The cover 103 comprises a fluidtight passage for the power supply cable.

To this end the cover 103 comprises a central neck or circular rib 152 adapted to be closed by a cap 153 of resilient material such as polyethylene.

The neck or circular rib 152 forms a compartment 154 adapted to receive electrical connecting members 155. A plug 156, for example of diallyl-phthalate, permits the selective plug-in coupling of connecting members. A plurality of these plugs may be provided for cooperating with said members.

The upper face 157 of cover 103 carries registering straps 158, 159 through which a rod 160 having at one end a head 161 is inserted, the other end of this rod carrying a retaining member 162. Thus, two rods 160 diametrally disposed ensure the suspension of the device by means of cords 163 formed with loops 164, and consisting advantageously of Teflon-impregnated glass fabric.

The upper wall 157 of cover 103 advantageously comprises a substantially flat portion 165 merging into a laterally sloping frustoconical portion 166. Thus, any stagnation of moisture or rain on the top surface of the device is safely prevented.

The structure of the bottom 105 closing the lower end 170 of the device is substantially the same as that of cover 103; however, the end wall 171 is preferably flat and perpendicular to the axis of the casing 100.

Transverse rods 172 are provided for suspending an aerial, in case the electronic assembly housed in the casing comprises A transmitter or a receiver, or alternately a transmitter-receiver apparatus in case the device is designed for answering questions picked up by the aerial and treated in the receiver.

The coupling 104 between the upper section 101 and the lower section 102 has substantially the same structure as the means described hereinabove in connection with the coupling between the cover and bottom on the one band, and the upper and lower sections, on the other hand.

I claim:

1. A device adapted to be suspended from an aircraft for carrying flat electronic apparatus comprising an elongated cylindrical casing, means at one end portion thereof for attaching the same to suspension cords depending from the aircraft, and internal slide-type holding and guiding means for securing plates comprising electronic component elements to said casing, the lateral wall of the casing being of externally metallized cardboard.

2. A device in accordance with claim 1, including a plurality of aligned casing sections, and external coupling collars assembling said sections together.

3. A device according to claim 1, further comprising a cover detachably mounted with respect to said casing, and an external coupling collar assembling said cover to said casing.

4. A device in accordance with claim 1, wherein the bottom of the casing is detachably mounted, and an external coupling collar assembling said bottom of said casing to said casing.

* * * * *